United States Patent [19]

Sinclair

[11] Patent Number: 5,244,429

[45] Date of Patent: Sep. 14, 1993

[54] GAS BARRIER COATING AND COATED ELASTOMERIC TOY BALLOONS

[75] Inventor: Harold K. Sinclair, Louisville, Ky.

[73] Assignee: Hi-Float Co., Inc., Louisville, Ky.

[21] Appl. No.: 884,901

[22] Filed: May 18, 1992

[51] Int. Cl.$^5$ .................. A63H 27/10; B05D 7/22

[52] U.S. Cl. ..................... 446/220; 427/230; 428/290; 244/31

[58] Field of Search .................. 446/220–226; 428/290; 427/230, 231, 236, 237; 244/31, 33

[56] References Cited

U.S. PATENT DOCUMENTS

| | | | |
|---|---|---|---|
| 2,037,049 | 4/1936 | Sager | 428/290 |
| 3,611,623 | 10/1971 | Copstead | 446/220 |
| 4,077,588 | 3/1978 | Hurst | 446/220 X |
| 4,290,763 | 9/1981 | Hurst | 446/220 X |
| 4,634,395 | 1/1987 | Burchett | 446/220 X |

*Primary Examiner*—Mickey Yu
*Attorney, Agent, or Firm*—Wood, Herron & Evans

[57] ABSTRACT

Polyvinyl alcohol coatings used to improve the bouyant life of elastomeric balloons include polyvinyl alcohol and a water soluble carbohydrate extender such as dextrose, at levels up to four times the weight of the polyvinyl alcohol. The improved coatings of the present invention typically give double the floating life of the balloon under a wide range of humidities.

20 Claims, No Drawings

GAS BARRIER COATING AND COATED ELASTOMERIC TOY BALLOONS

BACKGROUND OF THE INVENTION

Toy balloons generally have an inflated diameter ranging from about 15 cm to about 50 cm. These are conventionally filled with helium gas. Such lighter than air balloons have been widely sold and used for a number of years at places like circuses, fairs, toy stores, and the like. Another common use for such balloons is for advertising purposes wherein a logo or advertising message is printed on the outside surface of the balloon. In more recent years there has been a proliferation of balloon greeting service companies who, for a fee, deliver bunches of helium inflated elastomeric balloons, usually conveying a personal message, to individuals on birthdays, anniversaries, Valentine's Day, or other special occasions. Another popular use for this balloon delivery service is to send a get well message with up to a dozen helium inflated balloons to an adult or child who is convalescing from an illness in a hospital or other institution.

A major problem with such prior art helium filled elastomeric balloons is that they do not remain buoyant for very long; their typical buoyant lifetime ranges from a few hours to a day or so. This short buoyant lifetime is due to the diffusion of the very small helium atoms through the elastomeric envelope provided by the balloon. Because of the short buoyant lifetime, such balloons must be inflated at the time of sale or just prior to sale. They cannot be inflated in advance and stocked for use when needed.

Burchett U.S. Pat. No. 4,634,395, the disclosure of which is incorporated herein by reference, discloses a method of increasing the floating life of helium filled elastomeric balloons by coating a surface of the balloon with a solution of polyvinyl alcohol and a water soluble plasticizer such as glycerine which is the best known and most frequently used plasticizer for polyvinyl alcohol. Burchett also recited a group of other water soluble plasticizers which included ethylene glycol, propylene glycol, butylene glycol, sorbitol, diglycerol, low molecular weight polyethylene glycols, ethanolamine salts, sodium or ammonium thiocyanate, ethanol acetamide and ethanol formamide.

It was found that although the polyvinyl alcohol water solution alone would give increased floating life, the balloons underwent an undesirable change in appearance on aging. Namely, these balloons developed surface wrinkles within a day or two after inflation with helium and the wrinkling became progressively worse on aging the inflated balloons. After five or six days the balloons were severely puckered and disfigured. This wrinkling was aesthetically objectionable and also made writing on the balloons illegible. The wrinkling characteristics could be greatly reduced or eliminated by adding up to 20 percent by weight of a water soluble plasticizer for polyvinyl alcohol to the solution. However, the addition of water soluble plasticizer was found to decrease the buoyant lifetime of the balloon compared to the use of unplasticized polyvinyl alcohol.

Therefore the optimum concentration of plasticizer was found to be one that was just sufficient to eliminate wrinkling of the balloon. While several plasticizers were found to be useful, glycerine was found to be very effective at preventing wrinkling at concentrations low enough to still give a major increase in buoyant lifetime.

One disadvantage of such coatings taught by Burchett is that at high relative humidity, the overall buoyant lifetime of the coated balloon decreases significantly. For example, helium filled balloons coated with the coating solution disclosed in Burchett which floated an average of 10 days at 40 percent relative humidity were found to float only 6 days at 80 percent humidity and only 4 days at 90 percent humidity. This problem of increased permeability with increasing humidity is made worse by the glycerine plasticizer which acts as a humectant.

SUMMARY OF THE INVENTION

It has now been found that the buoyant lifetime of toy elastomeric balloons inflated with lighter than air gas such as helium can be greatly increased over those of Burchett by removing the glycerine plasticizer from the polyvinyl alcohol coating solution and replacing it with a water soluble carbohydrate, which we define here to mean any monosaccharide, disaccharide, water-soluble polysaccharide, or mixture of these. A preferred saccharide is dextrose. Instead of reducing the buoyant lifetime, the carbohydrate has been found to actually increase the buoyant lifetime when compared to using only water and polyvinyl alcohol. This has been found to be true even at levels of dextrose in the dried film of up to 80 percent. In particular, dextrose has been found to be a low cost extender for the polyvinyl alcohol which not only does not reduce the gas diffusion barrier property but actually increases it.

Moreover, the carbohydrate additive in the present invention was found to provide the protection against wrinkling of the balloon which made glycerine and the other water soluble plasticizers necessary in the Burchett patent.

Helium filled toy elastomeric balloons with the preferred coating of the present invention were found to float twice as long as prior art coatings over a wide range of relative humidity with no wrinkling or decrease in the appearance of the balloons up to several weeks.

These carbohydrate or saccharide additives to the polyvinyl alcohol solution were found to be not merely plasticizers for the polyvinyl alcohol but inexpensive extenders and enhancers of the polyvinyl alcohol gas barrier property. They serve in this capacity much better than the best known plasticizer, glycerine.

DETAILED DESCRIPTION

According to the present invention the bouyant life of a toy balloon is increased by coating the balloon with an aqueous solution of polyvinyl alcohol and a water soluble carbohydrate.

The coating liquids and methods of the present invention are uniquely suited for application with inflatable elastomeric balloons, and more particularly small inflatable elastomeric toy balloons used for the purposes of amusement, advertising and the like. The term "elastomeric toy balloon" therefore is meant herein to include those inflatable elastomeric toy balloons having at least one or more or all of the following parameters.

The first parameter concerns the inflated diameters of such balloons. More specifically, it is well known that elastomeric toy balloons as now manufactured are smaller in circumference and diameter in the uninflated state than in the inflated state. Likewise, it is known that upon inflation with a gas and preferably a lighter-than-air gas, such as helium, the elastomeric toy balloons are initially filled with the gas and then materially stretched or expanded as they are inflated to their inflated diameters. Thus, the term "inflated diameter" refers herein to the diameters of elastomeric toy balloons in the range of from about 10 cm up to about 80 cm, when the elastomeric toy balloon material is stretched via inflation with a gas. Generally such balloons stretched to buoyant capacity are about 500% greater in diameter than in an unstretched or relaxed state.

The second parameter which may be used to define elastomeric toy balloons herein is directed to the weight of the elastomeric toy balloons. More particularly, elastomeric toy balloons as defined herein preferably have uninflated weights in the range of from about 0.5 gms up to about 30 gms.

The third parameter for defining elastomeric toy balloons of this invention is concerned with the wall thickness of the envelopes which form such elastomeric toy balloons. Generally, the wall thickness for the envelopes of such elastomeric toy balloons preferably range from about 0.2 mm to about 0.5 mm when the balloons are in uninflated and unstretched conditions.

The fourth parameter relative to the definition of the term "elastomeric toy balloon" is the surface-to-volume ratio of such elastomeric toy balloons. In general, the surface-to-volume ratio is determinative of buoyancy of a balloon. The terms "surface" and "volume" as used therein refer to the surface area and volume of the elastomeric toy balloons, respectively, when in the inflated condition. As balloons increase in size, the surface-to-volume ratio decreases. With the large balloons, materials used for the balloons may be heavier since there is a larger volume of gas available per unit of surface area to support the heavier materials. On the other hand, as balloons decrease in size, the surface-to-volume ratio increases. This requires lighter materials to be used to make the smaller balloons to ensure adequate buoyancy. In other words, there is a much smaller volume of gas available per unit of surface area with the smaller balloons. Thus, weight is a much more critical factor from a buoyancy standpoint as the balloon size is reduced and the surface-to-volume ratio increases.

In the smaller inflatable elastomeric toy balloons widely available throughout the industry, the surface-to-volume ratio is large and the weight of the elastomeric toy balloon materials must therefore be carefully monitored if the elastomeric toy balloons are to float at all. The present invention therefor is generally concerned with the smaller elastomeric toy balloons having surface-to-volume ratios in the range of from about 0.075 $cm^2/cm^3$ to about 0.6 $cm^2/cm^3$.

Finally, the last parameter useful to define the elastomeric toy balloons is the material from which the elastomeric toy balloons of this invention are produced. Generally speaking, the elastomeric toy balloons are formed from rubber, such as natural rubber, and more particularly from rubber latex, like natural rubber latex.

The solution used to coat these balloons will include water, polyvinyl alcohol and a water soluble carbohydrate. The term "polyvinyl alcohol" as used throughout the specification refers to water soluble polyhydroxy compounds which can be generally characterized, for instance, by the presence of ($-CH_2-CHOH-$) units in the polymer chain. The term "polyvinyl alcohol" is also intended herein to include suitable derivatives of the water-soluble polyhydroxy compounds mentioned above, particularly those in which some of the hydroxyl groups are acetylated. These polymers are ordinarily prepared by the replacement of the acetate groups of polyvinyl acetate with hydroxyl groups as by, for example, hydrolysis or alcoholysis. The percent of acetate groups replaced by hydroxyl groups is the degree of hydrolysis of the polyvinyl alcohol thus formed and indicates the percent of hydroxyl groups present in the polyvinyl alcohol out of the total possible hydroxyl groups. This invention relates to polyvinyl alochols with a degree of hydrolysis above about 85 percent.

It will be appreciated by those skilled in the art that polyvinyl alcohol (PVOH) as discussed herein includes those polyvinyl alcohols, chemically modified, altered or otherwise, that can be used in accordance with the teachings of the present invention. For example, water resistance of the dried PVOH film can be enhanced by the addition of organic materials which are aldehydes or aldehyde donors to the aqueous liquids.

In another example, the polyvinyl alcohols may be partially etherified by reaction with alkaline oxides. It should be realized that the presence of small amounts of hydroxyethoxylation can reduce gelling of stored aqueous liquids containing a polyvinyl alcohol and thereby increase the shelf life of solutions. Also, the viscosity of the polyvinyl alcohol coating liquids may be reduced by the addition of a viscosity reducing agent, such as hydrogen peroxide, in desired effective amounts.

In yet another example, the hydroxyl groups on the polyvinyl alcohol backbone in general may be partially reacted to form, for example, ethers, esters, acetals, and/or ketals using techniques well known in the art. It is intended that those suitable derivatives of these and the above polyvinyl alcohol derivatives so obtained and the like are within the scope of the present invention.

The solution used to coat balloons will also include a water soluble carbohydrate, or saccharide. These saccharides include mono- and disaccharides including dextrose, glucose including the monohydrate, sucrose, arabinose, lactose, mannose, maltose, fructose, galactose, amylose, allose, altrose, talose, gulose, idose, erythrose, threose, lyxose, xylose, arabinose, rhamnose, and cellobiose. Low molecular weight water soluble polysaccharides such as glycogen are also included within the scope of this invention.

It should be clear that other ingredients can be added to the treating solution without substantially altering the manner in which it functions to obtain the desired result. For example, small amounts of mold preventing additives can be used to increase the shelf life of the solution. These include chemicals such as "Mycoban" TM (Pfiger, Inc.) or "Dowicide" TM (Dow Chemical Co.) added at levels up to 0.5 percent by weight. Also the formation of undesirable gel in the treating solution can be inhibited through the addition of up to 0.3 percent by weight "Triton" X-100 TM (Rohm & Haas Co.). The viscosity of the treating solution can be lowered somewhat by the addition of up to 3 percent by weight of hydrogen peroxide.

The coating solution is prepared by sprinkling polyvinyl alcohol solids into the vortex formed by rapidly stirring cold water. Rapid stirring is continued for 10 minutes in order to thoroughly wet and disperse the solids. Heat is then supplied by means of an immersed hot water coil to warm the slurry to about 90 degrees Centigrade in order to dissolve the polyvinyl alcohol. During this heating step the agitation is slowed to prevent shear degradation of the polymer. This heating step is continued for about 4 hours until the polyvinyl alcohol is completely dissolved.

Following the heating step the solution is cooled to about 6 degrees Centigrade and the water soluble carbohydrate is added and thoroughly blended into the solution. The carbohydrate is added after the solution has been cooled to prevent scorching and discoloring of the solution.

The level of polyvinyl alcohol in the solution can range from as little as about 3 percent by weight to as high as about 50 percent by weight of the total solution. Concentrations less than about 3 percent by weight do not give the desired increase in buoyant lifetime without multiple coatings. Higher concentrations of polyvinyl alcohol become too viscous to pour freely at room temperature. In any event it is recognized that the concentration of polyvinyl alcohol which yields a flowable solution is a function of the average molecular weight of the polyvinyl alcohol utilized; higher concentrations are possible when using lower molecular weight polymers.

The weight average molecular weight of the polyvinyl alcohol can range from about 13,000 to about 186,000. The preferred embodiment is a polyvinyl alcohol having a weight average molecular weight of 124,000 to 186,000 and used at a concentration of about 10 to 14 percent by weight. Although the preferred embodiment employs a polyvinyl alcohol which is about 87.0 to 89.0 percent hydrolyzed, other polyvinyl alcohols having a degree of hydrolysis up to over 99 percent can be used. A preferred material is Vinol 540 sold by Air Products and Chemicals, Inc. It has been found that the carbohydrate used in the solution can range from 1 percent to over 35 percent. Below about one percent by weight carbohydrate, very slight benefit in float life was observed. At low relative humidity, increasing the level of carbohydrate continued to provide increasing buoyant lifetime up to the maxim ratio examined which was four times the level of polyvinyl alcohol (i.e., the dried film contained about 80 percent carbohydrate). At very high relative humidities, it was found that high carbohydrate levels were not appreciably better than lower loadings. The preferred embodiment uses a coating solution containing dextrose monohydrate at a level of 3 to 20%, preferably 4 to 13 percent by weight.

The preferred method of coating the balloon is to inject the solution into the uninflated balloon through its opening, rub the exterior of the balloon to spread the coating around inside the balloon, inflate the balloon with helium, and then allow the coating to dry by suspending the balloon in air. Using this method typically requires about 5 to 10 grams of solution in a balloon having an inflated diameter of about 28 cm. Larger balloons will require more solution and smaller balloons will require less solution when treated by this method.

In some cases it is desirable to coat the outside surface of the balloon. This is done by dipping the uninflated balloon into the coating solution, withdrawing it, and letting it drain to remove any excess solution. The balloon is then inflated and the coating is allowed to dry while the balloon is in the inflated condition.

This invention will be further appreciated in light of the following detailed examples.

EXAMPLE 1

Aqueous solutions were prepared containing polyvinyl alcohol (Vinol 540: Air Products and Chemicals, Inc.) and with additives of either glycerine or dextrose monohydrate. Seven mL of each solution were injected into the openings of uninflated balloons made of natural rubber latex and having an inflated diameter of approximately 28 cm. Two balloons were treated using each solution. The balloons were rubbed to spread the coating over the inside surface and were then inflated with helium. The inflated balloons were suspended from short pieces of string taped to the wall of the test chamber. The time was recorded when the balloons were no longer floating. The average relative humidity in the test chamber during the test was about 88 percent and the average temperature was about 28 degrees Centigrade. Table 1 summarizes the results which show that the addition of glycerine to the polyvinyl alcohol solution reduced floating life whereas the addition of dextrose monohydrate increased floating life significantly. The dextrose additive was found to be as effective as the glycerine in preventing wrinkling or puckering of the balloons on aging.

TABLE 1

Balloon Float Life at High Humidity

| SAMPLES | PERCENT PVOH | ADDITIVE | PERCENT ADDITIVE | FLOAT LIFE DAYS |
|---|---|---|---|---|
| 1,2 | — | control-no coating | — | 1 |
| 3,4 | 11.9 | none | 0.0 | 7.5 |
| 5,6 | 11.9 | glycerine | 3.2 | 4 |
| 7,8 | 11.9 | dextrose monohydrate | 6.6 | 9 |
| 9,10 | 11.9 | dextrose monohydrate | 8.3 | 11 |

EXAMPLE 2

Aqueous solutions of polyvinyl alcohol were prepared as in Example 1 but the balloons were tested in a chamber maintained at low humidity. During the test the relative humidity in the chamber averaged about 40 percent and the temperature average about 39 degrees Centigrade. Two balloons were tested using each solution. Approximately 7 ml of solution was injected into each balloon and the inside surface of the balloon was coated by rubbing the outside of the balloon. The balloon was then inflated with helium to a size of 28 cm diameter, tied, and suspended in the test chamber a in Example 1. The amount of dextrose monohydrate was varied over a wide range as shown in Table 2 with the ratio of additive to polyvinyl alcohol in the solution ranging from 0.5 up to 4.0. A control using glycerine as the additive at the preferred level from the prior art was also tested for comparison. The results show a very significant increase in floating life of balloons with coatings containing dextrose over those containing glycerine. Dextrose was a very effective extender which actually improved the diffusion barrier properties of the dried film even at levels up to highest tested which was a dried film containing approximately 80 percent dextrose and only 20 percent polyvinyl alcohol. Again, the dextrose additive was found to be as effective as glycerine in preventing wrinkling of the balloons on aging.

TABLE 2

Balloon Float Life at Low Humidity

| SAMPLE | PERCENT PVOH | ADDITIVE | PERCENT ADDITIVE | RATIO* | FLOAT LIFE DAYS |
| --- | --- | --- | --- | --- | --- |
| A | — | no coating | — | — | 1 |
| B | 11.9 | glycerine | 3.2 | 0.3 | 7 |
| C | 11.9 | dextrose** | 5.9 | 0.5 | 19 |
| D | 11.2 | dextrose** | 11.2 | 1.0 | 25 |
| E | 10.6 | dextrose** | 16.0 | 1.5 | 45 |
| F | 10.1 | dextrose** | 20.2 | 2.0 | 42 |
| G | 9.1 | dextrose** | 27.5 | 3.0 | 61 |
| H | 8.4 | dextrose** | 33.6 | 4.0 | 58 |

*Ratio of additive to polyvinyl alcohol.
**Dextrose monohydrate

EXAMPLE 3

Aqueous solutions of polyvinyl alcohol were prepared as in Example 1 but the balloons were tested in a chamber maintained at an intermediate level of humidity. During the test the relative humidity in the chamber averaged about 80 percent and the temperature averaged about 23 degrees Centigrade. Table 3 summarizes the results which again show a very significant increase in floating life of balloons with coatings containing dextrose over those containing glycerine. Balloons containing the dextrose additive were again found to be free of wrinkles at the end of the test.

TABLE 3

Balloon Float Life at Intermediate Humidity

| SAMPLES | PERCENT PVOH | ADDITIVE | PERCENT ADDITIVE | FLOAT LIFE DAYS |
| --- | --- | --- | --- | --- |
| 1,2 | — | control-no coating | — | 1 |
| 3,4 | 11.9 | glycerine | 3.2 | 6 |
| 5,6 | 11.9 | dextrose monohydrate | 5.9 | 13.5 |
| 7,8 | 11.2 | dextrose monohydrate | 11.2 | 14.5 |

EXAMPLE 4

Aqueous solutions of polyvinyl alcohol were prepared as in Example 1 with glycerine, dextrose, sucrose, or no additives. Seven ml of solution were injected into each balloon and the balloon was rubbed to spread the coating over the inside surface. The balloons were then inflated with helium to a diameter of 28 cm and the floating life was measured as in Example 1. The balloons were tested in a chamber maintained at approximately 95 percent relative humidity to accelerate the results. The average temperature during the test was 30 degrees Centigrade. The test results are summarized in Table 4. The results show that adding glycerine to the polyvinyl alcohol coating solution decreased the float life. Solutions containing dextrose or sucrose gave longer floating life than solutions containing glycerine. No wrinkling was observed in the balloons with glycerine, dextrose, or sucrose.

TABLE 4

Balloon Float Life at Very High Relative Humidity

| SAMPLES | PERCENT PVOH | ADDITIVE | PERCENT ADDITIVE | FLOAT LIFE DAYS |
| --- | --- | --- | --- | --- |
| 1,2 | — | control-no coating | — | 1 |
| 3,4 | 11.9 | none | 0.0 | 5 |
| 5,6 | 11.9 | glycerine | 3.2 | 3 |
| 7,8 | 11.9 | dextrose monohydrate | 3.2 | 5.5 |
| 9,10 | 11.9 | sucrose | 3.2 | 5 |

EXAMPLE 5

Aqueous solutions were prepared using various grades of polyvinyl alcohol and with additives of either glycerine, dextrose monohydrate, or corn syrup, which is a mixture of dextrose, maltose, and dextrins with about 20 percent water. Low, medium, and high molecular weight grades of partially hydrolyzed polyvinyl alcohol were used as shown in Table 5. As in Example 1, two balloons were injected with 7 ml of each solution, rubbed to distribute the coating, then inflated with helium to a diameter of 28 cm and suspended in the test chamber. During the test the temperature in the chamber averaged 24 degrees Centigrade and the relative humidity averaged 58 percent. The time until the balloons were no longer floating was recorded. The results are shown in Table 5. The dextrose and the corn syrup additives were effective in preventing wrinkling of the balloons on aging.

TABLE 5

Floating Life of Balloons Coated With Various Grades of Polyvinyl Alcohol and Additive

| NO | POLYVINYL ALCOHOL | | | ADDITIVE | | FLOAT LIFE DAYS |
| --- | --- | --- | --- | --- | --- | --- |
| | TYPE | MOL. WT. | WT % | TYPE | WT % | |
| A | CONTROL | NO COATING | — | — | — | 1 |
| B | VINOL 540 | HIGH | 11.9 | GLYCERINE | 3.2 | 10 |
| C | VINOL 205 | LOW | 12.0 | DEXTROSE* | 18.01 | 22 |
| D | VINOL 205 | LOW | 11.3 | DEXTROSE* | 22.6 | 38 |
| E | VINOL 523 | MEDIUM | 11.9 | DEXTROSE* | 10.9 | 40 |
| F | VINOL 523 | MEDIUM | 11.9 | DEXTROSE* | 15.4 | 38 |
| G | VINOL 523 | MEDIUM | 11.9 | DEXTROSE* | 19.4 | 22 |
| H | VINOL 540 | HIGH | 11.5 | DEXTROSE* | 6.9 | 24 |
| I | VINOL 540 | HIGH | 11.5 | CORN SYRUP | 7.0 | 9.5 |

*dextrose monohydrate
Vinol brand of polyvinyl alcohol manufactured by Air Products and Chemicals, Inc.

The coating composition of the present invention thus significantly improves the buoyant life of the helium filled toy balloons. This benefit is particularly appreciated at high humidity levels. Further the present invention utilizes a coating solution that is particularly safe. Thus the present invention is safe, effective and inexpensive.

The preceding has been a description of the present invention along with the best mode of practicing the invention currently known to the inventor.

However the invention itself should only be defined by the appended claims wherein I claim:

1. A method of extending the buoyant life of a balloon comprising
coating a surface of a balloon with a coating composition comprising an aqueous solution of polyvinyl alcohol and a water soluble carbohydrate.

2. The method claimed in claim 1 wherein said polyvinyl alcohol has a weight average molecular weight of 13,000 to 186,000.

3. The method claimed in claim 1 wherein said carbohydrate is a saccharide selected from the group consisting of monosaccharides, disaccharides and water soluble polysaccharides.

4. The method claimed in claim 3 wherein said saccharide is selected from the group consisting of dextrose, glucose, sucrose, arabinose, lactose, mannose, maltose, fructose, galactose, amylose, allose, altrose, talose, gulose, idose, ribose, erythrose, threose, lyxose, xylose, arabinose, rhamnose, and cellobiose and glycogen.

5. The method claimed in claim 3 wherein said saccharide is selected from the group consisting of dextrose, glucose, sucrose, lactose, mannose, maltose, and fructose.

6. The method claimed in claim 3 wherein said solution has a concentration of polyvinyl alcohol of from about 3% to about 50% and a concentration of carbohydrate of from 1 to 35% by weight.

7. A coating composition comprising an aqueous solution of 3 to 50% by weight polyvinyl alcohol and 1 to 35% by weight of a water soluble carbohydrate.

8. The coating composition claimed in claim 7 wherein said polyvinyl alcohol has a weight average molecular weight of 13,000 to 186,000.

9. The coating composition claimed in claim 7 wherein said water soluble carbohydrate is selected from the group consisting of monosaccharides, disaccharides, and water soluble polysaccharides.

10. The coating composition claimed in claim 7 wherein said carbohydrate is selected from the group consisting of dextrose, glucose, sucrose, arabinose, lactose, mannose, maltose, fructose, galactose, amylose, allose, altrose, talose, gulose, idose, ribose, erythrose, threose, lyxose, xylose, arabinose, rhamnose, and cellobiose and glycogen.

11. The coating composition claimed in claim 7 wherein said carbohydrate is selected from the group consisting of dextrose, glucose, sucrose, lactose, mannose, maltose, and fructose.

12. The coating composition claimed in claim 9 wherein said solution has a concentration of polyvinyl alcohol of from about 3% to about 50% and a concentration of carbohydrate of from 1 to 35% by weight.

13. A toy balloon coated with the coating composition of claim 7.

14. A toy balloon coated with the coating composition of claim 8.

15. A toy balloon coated with the coating composition of claim 9.

16. A toy balloon coated with the coating composition of claim 10.

17. A toy balloon coated with the coating composition of claim 11.

18. A toy balloon coated with the coating composition of claim 12.

19. A toy ballon coated with an aqueous solution comprised 5 to 20% by weight water soluble polyvinyl alcohol and 3 to 20% by weight of a water soluble saccharide selected from the group consisting of monosaccharides and disaccharides.

20. The toy balloon claimed in claim 19 wherein said saccharide is dextrose monohydrate.

* * * * *